Figure 1:
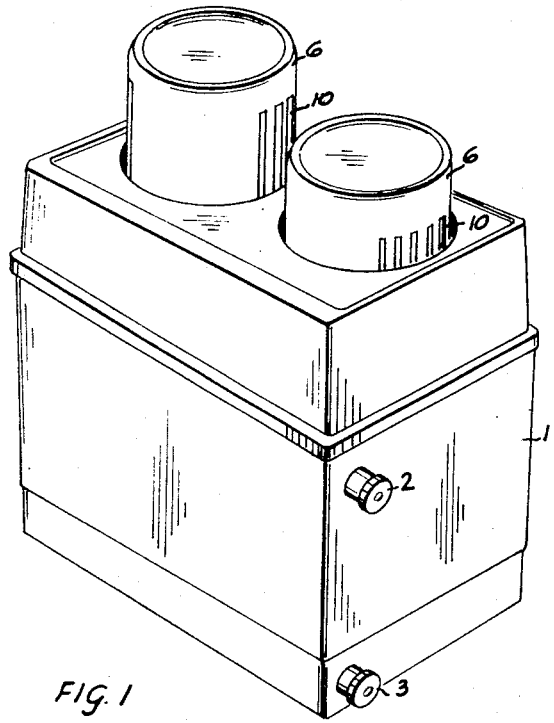

United States Patent [19]

Bloom et al.

[11] 3,746,170
[45] July 17, 1973

[54] LIQUID TREATMENT APPARATUS

[75] Inventors: Marshall E. Bloom, Atlanta; David K. Walz, Stone Mountain, both of Ga.

[73] Assignee: Bio-Lab, Inc., Decatur, Ga.

[22] Filed: Jan. 20, 1972

[21] Appl. No.: 219,451

[52] U.S. Cl. ............... 210/198, 23/267 E, 23/272.7
[51] Int. Cl. ............................................. C02b 3/06
[58] Field of Search ....................... 210/62, 97, 169, 210/198, 199, 200, 205, 206, 256; 23/267 A, 267 E, 272.7, 272.8

[56] References Cited
UNITED STATES PATENTS

| | | |
|---|---|---|
| 3,595,786 | 7/1971 | Horvath et al. ................. 210/198 R |
| 3,598,536 | 8/1971 | Christensen .................... 210/169 X |

Primary Examiner—Samih N. Zaharna
Assistant Examiner—Robert H. Spitzer
Attorney—Walter M. Rodgers

[57] ABSTRACT

An apparatus for treating a liquid which utilizes a container in which a solid treatment chemical is disposed and which is partially immersed in a reservoir of liquid maintained at a desired level and having openings above and below the liquid level is provided with means for adjusting the elevation of the container in the reservoir thereby to control the rate at which the liquid treating substance is dissolved and supplied from the container to the liquid.

8 Claims, 4 Drawing Figures

Patented July 17, 1973 3,746,170

LIQUID TREATMENT APPARATUS

In the chlorination of swimming pools, the degree of chlorine concentration must be regulated within well-known predetermined limits if adequate control of algae and bacteria is to be achieved and if the deleterious effects of excessive concentration of chlorine are to be avoided. While there are several types of continuous chlorinators for use with solid chlorine bearing compounds, there is no simple chlorinator that permits easy adjustment of the chlorination rate. The chlorination rate must be adjusted frequently due to changing conditions in the pool water.

According to this invention in its broader aspects, a container having a solid treatment chemical therein is partially immersed in a reservoir of liquid maintained at a desired level. The container has an opening below the liquid level in the reservoir for the circulation of liquid from the reservoir through the container and also has an opening above the liquid level in the reservoir to maintain the same liquid level in the container as in the reservoir. The container is bodily adjustable vertically so that controllable portions of the container and its contents may be immersed in the liquid in the reservoir thereby to control the rate at which treatment chemical is supplied to the liquid in the reservoir.

More specifically the container has a circular side wall and is designed to receive a treatment chemical in solid form which is slowly dissolved by the liquid circulating through the container. The container has a plurality of pairs of vertical channels on the upper portion of the side wall with each channel being located on the opposite side of the container from the corresponding channel in the air. Each channel has an adjustment ledge located at the same elevation from the bottom of the container as the corresponding channel in the pair. Each pair of channels has adjustment ledges at elevations that are step-wise in relation to the adjustment ledges in the adjacent pair of channels for easy adjustment of the dissolving rate of the solid treatment chemical in the container. The liquid treatment container is designed for disposition in an opening in the top of a liquid treatment apparatus. The pairs of channels on the container are designed to engage a corresponding pair of protrusions in the top opening of the liquid treatment apparatus. The adjustment ledges control the elevation of the container in the apparatus which determines the rate at which the solid is dissolved. Liquid is circulated through the reservoir and in turn through the openings in the container.

While the container and apparatus of this invention are not limited to any particular solid substance, they are especially useful when used in conjunction with solid chlorine containing solids for the chlorination of swimming pools. The solid substance may be of any configuration, but preferably is in pellet form. The container of this invention is particularly adaptable for use with certain types of continuous chlorinators commonly used in the chlorination of swimming pools.

Figure 3:
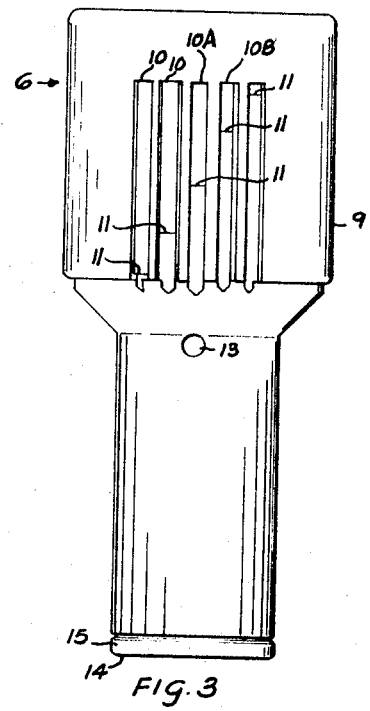
Figure 2:
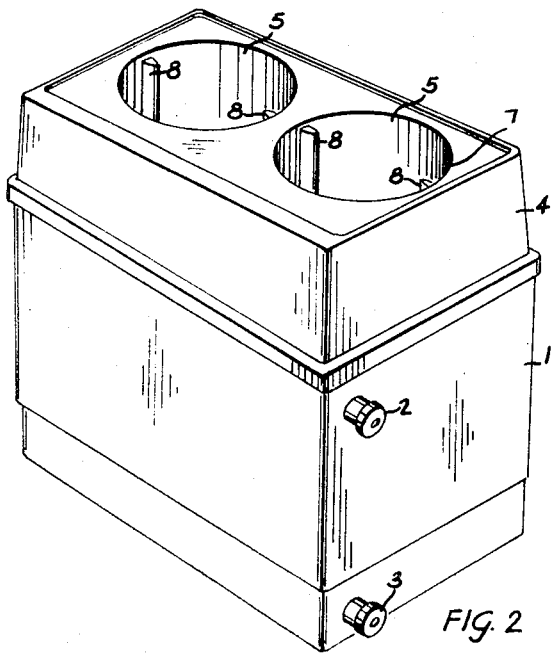
Figure 4:
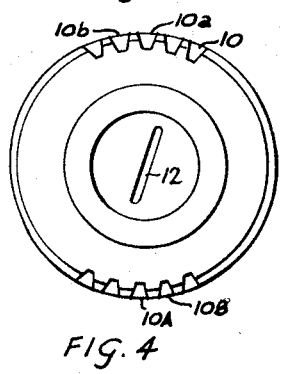

For a better understanding of the invention reference may be had to the following detailed description taken in conjunction with the accompanying drawing in which FIG. 1 constitutes a perspective view showing one form of the liquid treatment apparatus including the liquid treatment containers, FIG. 2 is a perspective view showing one form of the liquid treatment apparatus with the liquid treatment containers removed; FIG. 3 is a side view showing one form of the liquid treatment container; and in which FIG. 4 is a bottom view of a liquid treatment container.

With reference to the drawing, the numeral 1 is used to designate the tank constituting a liquid-containing reservoir of the liquid treatment apparatus. The tank 1 may be fabricated of any suitable material, but preferably is made of a plastic material that is non-reactive with the treatment chemicals. For the purpose of supplying liuqid to be treated to the tank 1 and for delivering the treated liquid from the tank 1, an inlet passage 2 and an outlet passage 3 of conventional construction are provided. Liquid is supplied to the inlet passage 2 and taken away from the outlet passage 3 by conventional conduits which are not shown in the drawing. The level of liquid within the tank 1 can be controlled by any suitable mechanism such as inlet and outlet valves that are actuated by a float in the tank 1 which is not shown in the drawing.

Affixed to the tank 1 is a top cover 4 which has two circular top openings 5 for the disposition of two liquid treatment containers 6 within the apparatus. Of course the apparatus may be constructed for the disposition of either a single or several liquid treatment containers 6. On opposite sides of each top opening 5 are two inwardly extending protrusions 8 that extend a short distance into the area defined by the opening and project downwardly into the tank 1 in axial alignment to the opening. These protrusions 8 may be supported in position about opening 5 by any convenient means. Preferably a hollow tubular element 7 supports the protrusions 8 and projects downwardly into the tank 1. In the preferred embodiment of the invention the protrusions 8 are in integral part of the tubular element 7.

The liquid treatment container 6 preferably is formed with circular side walls with its greatest diameter being slightly smaller than the top opening 5 of the apparatus. The container 6 may be fabricated of any suitable material but preferabl/ is formed of a plastic material that is non-reactive with the treatment chemicals. The container 6 has a plurality of pairs of vertical recesses or channels 10 located on the upper larger portions of the side wall so that each channel is located on the opposite side of the container 6 from the corresponding channel in the pair in the same spatial relationship as the protrusions 8 in the top opening 5. For example channel 10a and the diametrically opposite channel 10A are provided with ledges 11 which are positioned at the same level for simultaneously engaging the opposite protrusions 8. The recesses or channels 10 have the same general cross-sectional shape as the protrusions and are designed to receive and slide easily over the protrusions to facilitate easy insertion and removal of the container 6 from the top opening 5 in the apparatus. Each recess or channel 10 commences at the lowermost portion of the larger upper part of the container 6 and extends upwardly to an adjustment ledge 11. In the preferred embodiment as illustrated in FIG. 3 the top portion 9 of the container 6 has a greater diameter than the lower portion so that it is only necessary to locate channels 10 on the upper or larger portion 9 of the container 6. Of course the container 6 may be constructed so it is cylindrical with the same diameter throughout its height. In this case each channel 10 must commence at the lowermost portion of the container 6 and extend upwardly to the particular adjustment ledge 11. The adjustment ledge 11 is preferably formed as an integral part of the container 6 but may be fabricated separately and affixed to the channel 10. The pairs of adjustment ledges 11 are located at various elevations from the bottom of the container 6 so that the elevation of the container 6 in the tank may be adjusted by simply engaging the protrusions 8 in a different pair of channels 10. This can be accomplished by simply raising the container 6 until the channels 10 clear and are disengaged from the protrusions 8 and then turning the container 6 to the desired pair of channels 10 and lowering the container 6 until the adjustment ledges 11 rest on the top of the protrusions 8. Preferably the adjustment ledges 11 on each pair of channels 10 are located in stepped fashion with the adjustment ledges 11 of the immediately adjacent channels 10 as shown in FIG. 3 so that a small adjustment can be made by simply turning to an adjacent pair of channels 10. For example, if channels 10A and 10a are engaged with the protrusions 8 and it is desired to increase the dissolution rate slightly the container 6 may be raised and rotated in a clockwise direction as viewed in FIG. 4 to engage channels 10B and 10b which have adjustment ledges 11 at a slightly higher elevation and thus support the container 6 at a somewhat lower level thereby to expose a greater portion of the chemical in the container to liquid in tank 1. Although the channel and protrusion arrangement described above is preferred, the channels 10 may be located on the hollow tubular element 7 with the protrusions 8 being located on the side walls of the container 6.

The container 6 is provided with at least one circulation opening 12 which is positioned below the liquid level in the tank 1 for the circulation of liquid from the tank 1 through the container 6. This opening 12 may be of any size and shape that provides the desired circulation without permitting appreciable amounts of the solid treatment chemical to drop into the tank 1. The container 6 has at least one vent opening 13 which is positioned above the liquid level in the tank 1 to maintain the same liquid level in the container 6 as in the tank 1. The treatment chemical above this vent opening 13 is maintained in a substantially dry state and constitutes a reservoir of the chemical for supplying the lower operative portion of the container 6.

The bottom end 14 of the container 6 may be permanently affixed to the container 6, but preferably has means to permit its ready removal and attachment so that the container may be refilled with the solid treatement chemical once the original supply has been exhausted. The bottom portion of the side wall of the container 6 may be externally threaded for engagement with internal threads on the upwardly extending flange 15 of the bottom end 14.

From the description thus far, it is apparent that the liquid to be treated is drawn into the apparatus through inlet 2 and into the container 6 through the circulation opening 12. The liquid dissolves a portion of the solid treatment chemical and flows out of the container 6 and subsequently out of the outlet 3. A float mechanism in the tank 1 regulates the liquid level therein. A continuous flow of liquid through the container 6 develops due to circulation of liquid through the tank 1. The rate at which the solid treatment chemical is dissolved is controlled by the elevation of the container 6 in the tank 1. In operation, maximum dissolution is obtained by adjusting the container 6 to its lowest elevation in the tank 1. This will insure wetting of the maximum amount of the solid treatment chemical in the container 6. The location of the vent opening 13 above the liquid level in the tank 1 insures that the liquid level is the same in the container 6 as in the tank 1. The dissolution rate can be decreased by simply raising the container 6 in the tank 1. The size of the circulation opening 12 also controls the rate at which the treatment chemical is dissolved.

When this apparatus is used in the chlorination of swimming pools, it is usually connected across the pump as a by-pass with the inlet 2 connected to the discharge side of the pump and the outlet 3 connected to the low pressure side of the pump.

The embodiments of the invention in which an exclusive property or privilege is claimed are defined as follows:

1. A liquid treatment apparatus comprising a tank constituting a liquid-containing reservoir with a liquid inlet and outlet, said tank having means for controlling the level of liquid within the tank, said tank having a top end with at least one circular top opening, each top opening having a pair of vertical protrusions located on opposite sides of the opening in axial alignment to the opening, said vertical protrusions projecting downwardly into the tank and extending inwardly a short distance into the area defined by the opening, and means for supporting said vertical protrusions, and a liquid treatment container disposed within said top opening so that it is partially located below the liquid level in the tank, said liquid treatment container comprising means defining a container for receiving a supply of solid treatment material soluble in the liquid to be treated, said containter having a top end, bottom end smaller than said top end and a circular intervening side wall means, at least one circulation opening in the container positioned below the liquid level in the tank for the circulation of liquid from the tank through the container, and at least one vent opening in the container positioned above the liquid level in the tank to maintain the same liquid level in the container as in the tank, a plurality of pairs of vertical channels located on said side wall so that each channel is located on the opposite side of the container from the corresponding channel in the pair in such a manner as to engage the protrusion on the circular top opening, each channel commencing at the lowermost portion of the container with the greatest diameter and extending upwardly to an adjustment ledge which is located at the same elevation from the bottom of the container for each pair of channels, said adjustment ledges controlling the elevation of the container within the tank, the pairs of channels having adjustment ledges at various elevations from the bottom of the container so as to provide a means for adjusting the liquid level in the container.

2. A liquid treatment apparatus as defined in claim 1 and further characterized by the vertical protrusions in each top opening of the tank being an integral part of a hollow tubular element defining said top opening, said tubular element projecting downwardly into the tank and being attached to the top end of the apparatus.

3. A liquid treatment apparatus as defined in claim 2 and further characterized by the liquid treatment container having means for detachably engaging said bottom end to said side wall.

4. A liquid treatment apparatus as defined in claim 3, and further characterized by said liquid treatment container having pairs of channels arranged so that the elevation of the adjustment ledges from the bottom of the container increases step wise from the pair of channels with the adjustment ledges at the lowest elevation to the adjacent pair of channels and so on to the pair of channels with adjustment ledges at the highest elevation.

5. A liquid treatment container for disposition within a tank constituting a liquid-containing reservoir comprising means defining a container for receiving a supply of solid treatment material soluble in the liquid to be treated, said container having a top end, bottom end smaller than said top end and a circular intervening side wall, means at least one circulation opening in the container least one vent opening in the container positioned above said circulation opening a plurality of pairs of vertical channels located on said side wall means so that each channel is located on the opposite side of the container from the corresponding channel in the pair, each channel extending upwardly to an adjustment ledge which is located at the same elevation from the bottom of the container for each pair of channels, the pairs of channels having adjustment ledges at various elevations from the bottom of the container so as to provide a means for adjusting the position of said container in such tank 6. A liquid treatment container as defined in claim 5 and further characterized by means for detachably engaging said bottom end to said side wall means.

7. A liquid treatment container as defined in claim 6 and further characterized by said pairs of channels being arranged so that the elevation of the adjustment ledges from the bottom of the container increases stepwise from the pair of channels with the adjustment ledges at the lowest elevation to the adjacent pair of channels and so on to the pair of channels with adjustment ledges at the highest elevation.

8. Liquid treatment apparatus comprising a reservoir having an inlet and an outlet and normally containing liquid at a predetermined level, a top cover for said reservoir, at least one opening formed in said top cover, at least one hollw tubular element depending downwardly from said top cover and disposed in coincidental relation to said opening, at least one inwardly extending protrusion on said hollow tubular element, a container adapted for partial submersion in the liquid in said reservoir and constituting a repository for a liquid treatment chemical, a circulation opening in a wall of said container and located below the level of liquid in said reservoir, a vent in a wall of said container and located above the level of liquid in said reservoir, a plurality of vertically disposed channels formed on the exterior surface of the wall of said container, and an outwardly extending ledge formed in each of said channels, said ledges being disposed at different levels and being selectively engageable by said inwardly extending protrusion to determine the elevation of said container relative to said reservoir.

* * * * *

UNITED STATES PATENT OFFICE
CERTIFICATE OF CORRECTION

Patent No. 3,746,170 Dated July 17, 1973

Inventor(s) Marshall E. Bloom et al.

It is certified that error appears in the above-identified patent and that said Letters Patent are hereby corrected as shown below:

Column 5, line 13, after "wall" cancel the comma (,); same line 13, after "means" insert a comma (,); line 14, after "container" insert a comma (,); same line 14, before "least" insert -- at --; line 15, after "opening" insert a comma (,); line 17, after "means" insert -- in said top end --. Column 6, line 12, "holw" should read -- hollow --.

Signed and sealed this 29th day of January 1974.

(SEAL)
Attest:

EDWARD M. FLETCHER, JR.
Attesting Officer

RENE D. TEGTMEYER
Acting Commissioner of Patents